United States Patent [19]

Shiroishi et al.

[11] 4,439,794
[45] Mar. 27, 1984

[54] MAGNETIC HEAD

[75] Inventors: Yoshihiro Shiroishi, Higashimurayama; Hideo Fujiwara, Tachikawa; Takeshi Kimura, Kokubunji; Noriyuki Kumasaka, Ohme; Nobuo Kobayashi, Kokubunji; Takeo Yamashita, Hachioji; Teizo Tamura, Katsuta; Hideo Zama, Yokohama; Mitsuhiro Kudo, Tokyo; Tsutomu Iimura, Tachikawa, all of Japan

[73] Assignees: Hitachi, Ltd.; Hitachi Metals, Ltd., both of Tokyo, Japan

[21] Appl. No.: 264,706

[22] Filed: May 18, 1981

[30] Foreign Application Priority Data

May 16, 1980 [JP] Japan ................................. 55/63938

[51] Int. Cl.³ .......................... G11B 5/251; G11B 5/14
[52] U.S. Cl. ................................. 360/127; 252/62.59; 252/62.62
[58] Field of Search ................. 428/692; 360/127; 252/62.59, 62.62

[56] References Cited

U.S. PATENT DOCUMENTS

| 3,931,642 | 1/1976 | Kugimiya et al. | 360/127 |
| 4,246,619 | 1/1981 | Hirai et al. | 360/127 X |
| 4,285,894 | 8/1981 | Watanabe et al. | 252/62.59 X |
| 4,316,228 | 2/1982 | Fujuiara et al. | 360/127 |

FOREIGN PATENT DOCUMENTS 2641319 3/1978 Fed. Rep. of Germany ...... 360/127

Primary Examiner—George F. Lesmes
Assistant Examiner—Nancy A. B. Swisher
Attorney, Agent, or Firm—Antonelli, Terry & Wands

[57] ABSTRACT

A magnetic head which uses single crystal Mn-Zn ferrite containing up to 7% by weight of $SnO_2$ occluded therein without being allowed to separate and which has such a construction that glass having a contraction rate lower than that of ferrite is filled in the narrowed portion near the gap, the plane forming the principal magnetic circuit of the core is allowed to coincide with the {110} plane of the ferrite and an angle $\theta$ between the <100> direction inside the {110} plane of the ferrite and the gap-forming plane is from 5° to 40° or 85° to 120°. The magnetic head having such a construction has a reduced modulation noise and extremely excellent write-and-read characteristics.

11 Claims, 16 Drawing Figures

MAGNETIC HEAD

BACKGROUND OF THE INVENTION

This invention relates to a magnetic head for a magnetic recording apparatus (hereinafter referred to simply as the "magnetic head"). More particularly, the present invention relates to a magnetic head consisting of two magnetic blocks of high permeability facing each other via a gap on the portion facing the magnetic recording medium, at least one of the blocks having a magnetic core consisting of single crystal ferrite.

Demands are extremely strong nowadays for higher development of magnetic recording technology, especially for higher density magnetic recording. In order to meet the demands, sharp improvements of the recording characteristics, reproducing sensitivity and reduction of noise along with enhancement of coercive force and magnetic flux density must be accomplished.

Magnetic heads that are commonly employed at present have the construction such as shown in FIG. 1, for example, in which coils 13, 13' are respectively wound on magnetic cores formed by so coupling two magnetic blocks 11 and 11' of high permeability as to define a coil-winding window 10 via a gap 12. Single crystal ferrite is generally known as the magnetic material of high permeability for forming the magnetic core. Cubic system Mn-Zn ferrite is generally employed as the single crystal ferrite. In comparison with metal alloys such as permalloy and senalloy (Fe-Al-Si), this ferrite single crystal is more excellent in high frequency characteristics and wear resistance but is not free from the drawbacks that rubbing noise with respect to a recording medium such as a magnetic tape and modulation noise are great.

To reduce the rubbing noise, various proposals have heretofore been made as exemplified by Japanese Patent Publication Nos. 24998/1977, 24999/1977 and 32691/1978. These prior art proposals are characterized by use of Mn-Zn ferrite single core as the magnetic core, Mn-Zn ferrite single core having separated different substances such as $SnO_2$ by heat-treatment. This $SnO_2$ different substance is non-magnetic and is generally from 0.1 to several $\mu$m in width and 1 to several scores ($\mu$m) in length.

Along with improvements in higher density magnetic recording in recent years, however, the track width $t_w$, gap length $g_l$ and gap depth $g_d$ of the magnetic head have been reduced markedly. By way of example, in the magnetic head of a video tape recorder for home use such as shown in FIG. 2, $t_w$, $g_l$ and $g_d$ are only about 30 $\mu$m, 0.5 $\mu$m and 50 $\mu$m, respectively and as to the gap length especially, accuracy of about ±0.05 $\mu$m is required. In the drawing, reference numeral 20 represents the coil-winding window, 21 and 21' represent the ferrite blocks and 22 represents the gap. Reference numerals 23 and 23' represent the coils, 24 designates the filling glass and 25 and 25' represent the portions facing the magnetic recording medium. Reference numeral 26 represent the gap-forming plane. If the abovementioned ferrite material in which considerably great non-magnetic materials are separated is employed as the head material, effective $g_l$ increases whereas effective $g_d$ and $t_w$ decrease because the different materials are magnetically equivalent to the gap, thus causing deterioration and variation of the recording and reproducing characteristics and fluctuation of the characteristics due to wear. As compared with the material in which different substances are separated, the material in which the different substances are separated is inferior in the wear resistance and has greater coercive force. These problems hold true for the magnetic heads for magnetic audio apparatus.

For the abovementioned reasons, a low noise material devoid of the different substances, that are magnetically equivalent to the gap, is preferred as the magnetic material for the magnetic head. As to the noise of the ferrite head, however, the modulation noise accounts for the major proportion and hence, for the purpose of noise reduction, it is more preferred to reduce the modulation noise.

In order to obtain a magnetic head having higher performances, it is therefore necessary to look for a magnetic substance of high permeability in which no different substance exists.

If such single crystalline magnetic materials having a reduced modulation noise are obtained, a magnetic head having the highest write-and-read characteristics and the most excellent carrier signal-to-noise ratio is then prepared. The Mn-Zn ferrite generally exhibits the magnetic anisotropy having the easy axis of magnetization in the direction of <100> or <111> in accordance with the proportions of $Fe_2O_3$, MnO and ZnO as its principal components.

However, the disposition of the crystalline axes inside the magnetic core of the magnetic head has not sufficiently been examined and no definite guiding principle has yet been established.

It is quite natural that the write-and-read characteristics of the magnetic head depends upon the mode of distribution of magnetic reluctances inside the magnetic core.

However, it is difficult to obtain detailed information of the surface work of the ferrite, especially of changes in the magnetic characteristics due to work in the proximity of the gap which strongly determines the characteristics of the magnetic head. Namely, it is extremely difficult to estimate what distribution of magnetic reluctances is accomplished how the crystalline orientation is disposed under what work conditions. Even if such estimation is possible, it is extremely difficult, even by use of a presently available high performance computers, to calculate how the axes of magnetic anisotropy be disposed at the gap in order to obtain the best write-and-read characteristics. This may be the primary reason why the desirable disposition of the crystalline axes in the magnetic core is extremely indefinite.

The following references are cited to show the state of the art:

---
(1) Japanese Patent Publication No. 24998/1977
(2) Japanese Patent Publication No. 24999/1977
(3) Japanese Patent Publication No. 32691/1978
---

SUMMARY OF THE INVENTION

It is therefore a first object of the present invention to provide a magnetic head which uses a ferrite material devoid of different substances and having reduced modulation noise and which has reduced modulation noise.

It is a second object of the present invention to provide a magnetic head which has especially excellent magnetic write-and-read characteristics as well as an especially excellent carrier signal-to-noise ratio by skillfully utilizing the magnetic anisotropy of the abovementioned low modulation noise ferrite.

The magnetic head in accordance with the present invention to accomplish the abovementioned objects has two magnetic blocks of high permeability facing each other via the gap wherein at least one of the magnetic blocks of high permeability consists of single crystal Mn-Zn ferrite containing up to 7% by weight, preferably 2 to 5% by weight, of SnO₂ occluded therein without being allowed to separate; the {110} plane of at least one of the single crystal Mn-Zn ferrite is made substantially parallel to the plane forming the principal magnetic circuit; an angle $\theta$ of the direction of <100> existing inside the {110} plane with respect to the gap-forming plane is 5° to 40° or 85° to 120°; and glass having a contraction at the time when the temperature is reduced from the glass setting temperature down to room temperature (hereinafter simply called the "contraction rate") is lower than the contraction rate of the ferrite is fuse-attached to the surfaces of the magnetic blocks of high permeability at least near the gap.

DETAILED DESCRIPTION OF THE INVENTION

Figure 1:
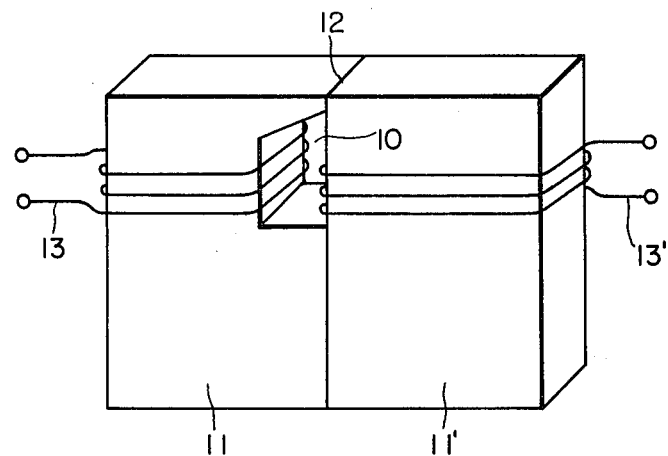
FIGS. 1 and 2 are perspective views showing the general construction of the magnetic head.

The inventors of the present invention measured various noises of a magnetic head, using Mn-Zn ferrite, such as modulation noise, rubbing noise, amplifier noise and the like, as well as its write-and-read characteristics and examined the magnetic and elastic properties of the materials employed. As a result, the inventors confirmed that the elastic and magnetic properties of the core material could be improved and the modulation noise of the magnetic head using such a material could be reduced if SnO₂ was occluded in ferrite without allowing its separation. In other words, the inventors formed a core by occluding SnO₂ in Mn-Zn ferrite without allowing its separation and examined the effect of reducing the modulation noise brought forth by the occlusion amount of SnO₂, the modulation noise being generated by sliding of a recording medium relative to the magnetic head. Thus, the inventors experimentally confirmed that the modulation noise could be reduced without deteriorating the write-and-read characteristics of the magnetic head by forming the head from ferrite in which up to 7% by weight of SnO₂ was occluded without being allowed to separate. The effect was found remarkable especially when the occlusion amount of SnO₂ was from 2 to 5% by weight. This effect was found irrelevant to the crystalline property of the ferrite, that is, whether it is single crystal or poly-crystalline.

In order to occlude up to 7% by weight of SnO₂ in the single crystal ferrite, the single crystal may be produced in accordance with the known Bridgeman method using the starting material containing a predetermined amount of SnO₂. According to this method, SnO₂ is contained in the ferrite in the perfectly occluded state. Incidentally, if the single crystal produced by the Bridgeman method is further heat-treated after its production, SnO₂ is allowed to separate.

It is not desirable to employ SnO₂ to be occluded in the Mn-Zn ferrite in an amount exceeding 7% by weight because not only the effect of enhancing the carrier signal-to-noise ratio of the invention cannot be observed but also the carrier signal-to-noise is likely to lower, on the contrary.

The abovementioned single crystal Mn-Zn ferrite is formed by occluding up to 7% by weight of SnO₂ in a ferrite composition consisting of 40 to 66% of Fe₂O₃, 10 to 50% of MnO and 5 to 35% of ZnO in terms of mol ratio. As materials having a high saturation flux density and excellent write-and-read characteristics, preferred is a ferrite composition consisting of 58 to 65 mol% of Fe₂O₃, 21 to 30 mol% of MnO and 5 to 21 mol% of ZnO. As to the head performance, a material for the low noise, a material for the high output and a material for the high carrier signal-to-noise ratio are preferred, respectively, a composition consisting of 50 to 58 mol% of Fe₂O₃, 21 to 26 mol% of MnO and 16 to 25 mol% of ZnO, a composition consisting of 50 to 58 mol% of Fe₂O₃, 30.5 to 38.5 mol% of MnO and 10 to 19.5 mol% of ZnO, and a composition consisting of 50 to 58 mol% of Fe₂O₃, 26 to 30.5 mol% of MnO and 11.5 to 24 mol% of ZnO (each composition further containing up to 7% by weight of SnO₂). Each of the abovementioned single crystal ferrite has a magnetocrystalline anisotropy constant of $-1.5 \times 10^4$ to $8 \times 10^3$ erg/cc.

In the magnetic head in accordance with the present invention, glass having the abovementioned contraction rate lower than that of ferrite is attached by fusing to the ferrite surface at least close to the gap (except the surface facing the magnetic recording medium and the gap-forming surface) in order to generate the tensile stress inside the ferrite near the gap and to control the magnetic anisotropy of ferrite through the reverse magnetostrictive effect due to the existence of this tensile stress. Using this controlled magnetic anisotropy, the magnetic head of the invention enhances the write-and-read characteristics and the carrier signal-to-noise ratio. However, if the ferrite composition does not fall under the abovementioned ranges, both magnetocrystalline anistoropy constant and magnetostriction coefficient become unsuitable so that desired magnetic anisotropy cannot be obtained even if the tensile strength exists and the effect of the present invention cannot be expected.

In order to induce uniaxial anisotropy in the ferrite plate by applying a tension to the surface regardless of the sign of $K_1$, the surface must be parallel to the {110} plane. When compressive stress is to be applied, uniaxial anisotropy is induced also on other planes. However, if this stress is applied to the glass that is attached by fusing, the tensile stress acts upon the glass, thereby causing cracks of the glass. Hence, this is not practical. Since the ferrite surface, to which the glass is to be attached by fusing, is primarily the plane forming the principal magnetic circuit, it is necessary after all to render the plane forming the principal magnetic circuit substantially parallel to the {110} plane in order to induce the uniaxial magnetic anisotropy inside the ferrite surface by applying the tension to the surface. For this reason, the {110} plane of the single crystal Mn-Zn ferrite of the magnetic head of the present invention is rendered substantially parallel to the plane forming the principal magnetic circuit.

Figure 2:
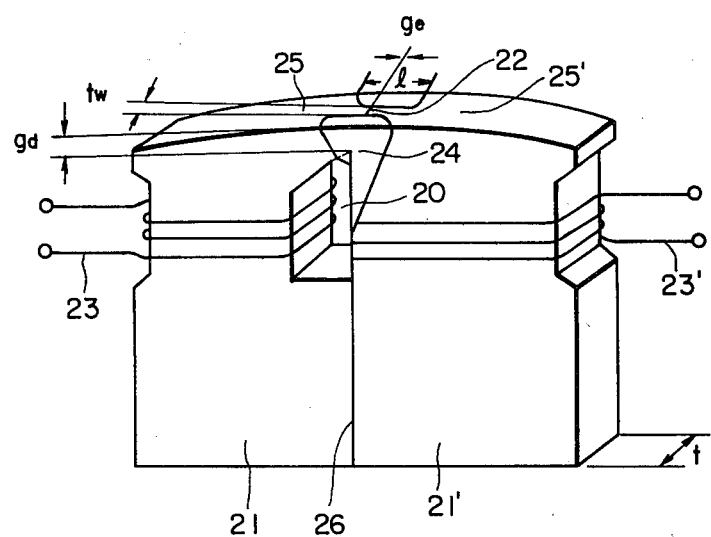

The abovementioned term "close to the gap side surface" principally represents a side surface which is substantially parallel to the plane forming the principal magnetic circuit. Namely, it represents the region from a radius $g_d$, having its center at the point of intersection of the plane facing the magnetic recording medium with respect to the gap-forming plane, up to the region of $10g_d$. Here, $g_d$ represents the depth of the gap-forming plane and is illustrated in FIG. 2. If the glass is attached by fusing to the side surface falling under this region from the gap-forming plane, it becomes possible to so control the magnetic anisotropy of the ferrite as to sufficiently improve the write-and-read characteristics and carrier signal-to-noise ratio of the magnetic head. The portion close to the gap side surface corresponds to the known sides of the narrowed track-width determining portion.

The magnetic head in accordance with the present invention has two magnetic blocks of high permeability that oppose each other via the gap, and at least one of the blocks consists of the single crystal Mn-Zn ferrite containing occluded $SnO_2$. Since the single crystal Mn-Zn ferrite is excellent as a magnetic core material as described already, it is generally preferred that both of two magnetic blocks of high permeability be composed of the single crystal Mn-Zn ferrite. Similarly, in the magnetic head in accordance with the present invention, at least one of the abovementioned single crystal Mn-Zn ferrite must satisfy the condition of the aforementioned crystalline orientation. Hence, it is more preferred that both of the two single crystal Mn-Zn ferrite satisfy the condition of the crystalline orientation.

The glass that is to be attached by fusing near the side surface of the gap is filled into the narrowed track-width determining portion disposed at this portion, as is known in the art. Originally, this narrowed track-width portion is disposed in order to narrow the track width.

If the aforementioned angle $\theta$ falls under the range of 5° to 40° or 85° to 120°, the write-and-read characteristics and carrier signal-to-noise ratio of the magnetic head in accordance with the present invention become more excellent than the prior art devices. Further excellent write-and-read characteristics as well as the carrier signal-to-noise ratio could be obtained if the abovementioned angle $\theta$ is within the range of 10° to 34° or 94° to 115° and more preferably, from 20° to 30° or 100° to 110°. The best result could be obtained if the angle $\theta$ is within the range of about 25° or about 105°. In this case, in the magnetic head shown in FIG. 2, if $\theta$ is 25°, the plane forming the principal magnetic circuit is on the {100} plane, the gap forming plane 26 is substantially on the {332} plane and the portions 25, 25' facing the magnetic recording medium are substantially on the {311} plane. If $\theta$ is 105°, they are on the {110} plane, substantially on the {611} plane and substantially on the {311} plane, respectively. If the angle $\theta$ is out of the range of 5° to 40° or 85° to 120°, it is only possible to obtain the write-and-read characteristics and the signal carrier-to-noise ratio that are equal or inferior to the prior art.

If the contraction rate of the glass is lower than that of the single crystal Mn-Zn ferrite to be employed, the write-and-read characteristics superior to the prior art can be expected, but if the former is equal to or higher than the latter, the abovementioned effect can not be expected. If the difference of the contraction rate between the glass and the ferrite is greater than $1.3 \times 10^{-3}$, a crack is likely to occur in the proximity of the gap whereby a decrease in the production yield will occur. If the difference is smaller than $0.2 \times 10^{-3}$, control of the magnetic anisotropy would become insufficient. It is therefore preferred that the contraction rate of the glass is lower than that of the ferrite and the difference between them is from $0.2 \times 10^{-3}$ to $1.3 \times 10^{-3}$. So long as the glass has a contraction rate falling under the predetermined range and satisfies known design conditions, glass of any composition may be employed.

The inventors of the present invention produced a large number of magnetic head samples using the abovementioned single crystal Mn-Zn ferrite of varying compositions and examined the relationship between the write-and-read characteristics and the carrier signal-to-noise ratio versus the orientation of crystalline axes of the ferrite near the gap. On the basis of the novel finding thus obtained, the present invention was perfected. In other words, the present invention contemplates to provide a magnetic head having excellent write-and-read characteristics and excellent carrier signal-to-noise ratio by using the single crystal Mn-Zn ferrite containing occluded $SnO_2$ as the magnetic core material, allowing the tensile stress to act upon the ferrite near the gap of the magnetic core to simplify the easy axis of magnetization of the magnetic anisotropy near the gap and optimizing the orientation of the easy axis of magnetization on both sides of the gap.

As described already, the performance of the magnetic head is especially strongly determined by the magnetic characteristics near the gap. This trend becomes all the more remarkable in the magnetic head, such as shown in FIG. 2, in which the thickness of the magnetic core is increased as much as possible except the portion near the gap in order to narrow the track width in the extreme while maintaining the mechanical strength, and to reduce the total magnetic reluctance of the magnetic core. Hence, the characteristics of the magnetic head could greatly vary in accordance with the direction of the easy axis of magnetization near the gap and hence, with the orientation of the crystalline axes of the single crystal ferrite.

Though the single crystal Mn-Zn ferrite used for the magnetic head generally has a small average magnetostriction constant, the magnetostriction constants in the <100> and <111> directions expressed by $\lambda_{100}$ and $\lambda_{111}$, respectively, have the absolute values of up to $20 \times 10^{-6}$, though their signs are different. A deformed layer of a thickness ranging from several hundred nm to several $\mu$m is formed on the ferrite surface that is machined in accordance with the ordinary working methods such as outer blade slicer, dicing machine, wire saw, and so forth. It is known that the tensile stress occurs inside the ferrite due to this deformed layer. The portion of the magnetic tape that faces the recording medium is ordinarily polished by a lapping tape or by lap and is unavoidably brought into contact with the magnetic recording medium not only in the magnetic tape apparatus but also in a floating head type magnetic disc apparatus, and the working effect by them is by no means negligible, either. Due to the induced magnetic anisotropy caused by these various residual strains through the reverse magnetostrictive effect, it is generally quite impossible to estimate the distribution of the magnetic anisotropy in the proximity of the gap of the magnetic head which is composed of the single crystal Mn-Zn ferrite, unless these residual strains are positively controlled.

Figure 3A:
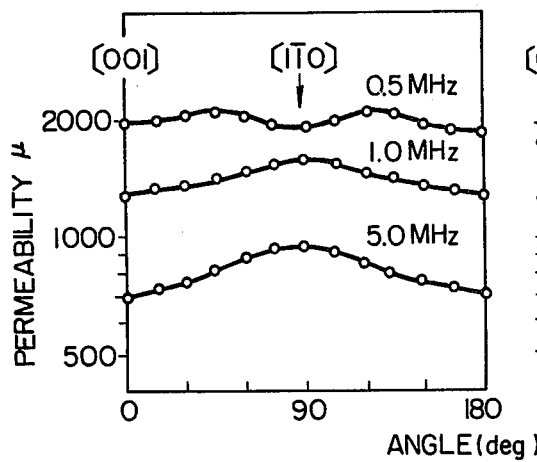
FIG. 3(a) is a diagram showing the frequency dependence of anisotropy of magnetic permeability inside the {110} plane in an SnO₂ occlusion Mn-Zn ferrite devoid of residual strain.
Figure 3B:
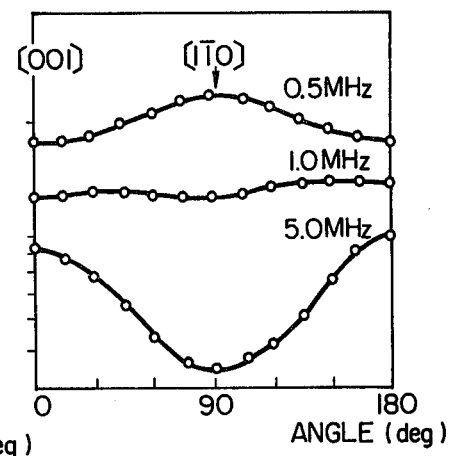
FIG. 3(b) is a diagram showing the frequency dependence of anisotropy of magnetic permeability inside the {110} plane in an SnO₂ occlusion Mn-Zn ferrite having residual strain.

When, for example, a disc of single crystal Mn-Zn ferrite (consisting of 54 mol% $Fe_2O_3$, 27 mol% MnO and 19 mol% ZnO, crystalline magnetic anisotropy $K_1$ of +2 to $4 \times 10^3$ erg/cc) having the (110) plane as the wide plane and containing 3 wt.% of $SnO_2$, in produced and the permeability is measured for the disc under the state devoid of the residual strains and under the state where they are present, respectively, the permeability exhibits remarkable anisotropy as shown in FIGS. 3(a) and 3(b), and it is found that the anisotropy varies with the existence of the residual strains and with the measuring frequency. FIG. 3(a) shows the case in which the residual strains do not exist and FIG. 3(b) shows the case in which they exist. In either drawing, the ordinate represents the permeability and the abscissa, the orientation in terms of angles from the [001] direction. The abovementioned disc is finished by lapping after the ferrite single crystal is mechanically sliced. The as finished disc is used as the sample having the residual strains while the disc whose surface layer is removed by corrosion after the disc is dipped in a concentrated phosphoric acid solution at 70° C., is used as the sample devoid of the residual strains. Since the anisotropy constant $K_1$ is positive (+) in the sample devoid of the residual strains, the direction of the [001] axis is the easy axis of magnetization and the permeability becomes minimal in the direction of the [001] axis on the high frequency side, correspondingly. By contrast, when the residual strains exist, the permeability becomes minimal in the direction of [1̄10], which is perpendicular to the direction of the abovementioned [001] axis, on the high frequency side. As viewed inside the (110) plane, it can be understood that the easy axis of magnetization is induced in the direction of [1̄10] inside its plane. In this case, the frequency characteristics of the anisotropy of the permeability vary markedly in accordance with the degree of the residual strains, and the permeability in the [1̄10] direction becomes high on the higher frequency side as the residual strains become greater.

As described above, it has been confirmed that the magnetic anisotropy varies remarkably depending upon the working state. It can be then understood that the anisotropy of the permeability is considerably great and the recording characteristics would remarkably change with the mode of orientation of the crystalline axes at the gap portion.

When theoretical examination is made of the anisotropy when the residual strains are applied, it can be understood that in the Mn-Zn ferrite that is generally employed, the anisotropy of the permeability can be controlled as desired, regardless of the positive or negative sign of the anisotropy constant $K_1$. In other words, the magnetostriction constants $\lambda_{100}$ and $\lambda_{111}$ of the generally used Mn-Zn ferrite are $-5 \times 10^{-6}$ to $-10 \times 10^{-6}$ and $3 \times 10^{-6}$ to $7 \times 10^{-6}$, respectively. By applying a tensile stress $\sigma$ of about several Kg/mm$^2$ to the {110} plane of the single crystal ferrite having these magnetostriction constants, it becomes possible to have the <110> direction inside the {110} plane the easy axis of magnetization within the $K_1$ range of $K_1 < 3|\lambda_{111}\sigma|$ when $K_1 > 0$, and within the $K_1$ range of $|K_1| < 3|(\lambda_{100} - \lambda_{111})\sigma|$ when $K_1 < 0$. If the abovementioned values of $\lambda_{100}$, $\lambda_{111}$ and $\sigma$ are used, the $K_1$ range providing the abovementioned effect is $-2 \times 10^4$ erg/cc to $1 \times 10^4$ erg/cc. In determining the range of this $K_1$ value, the presence of the anisotropy constant $K_2$, that is generally said to be small, is neglected.

Figure 4:
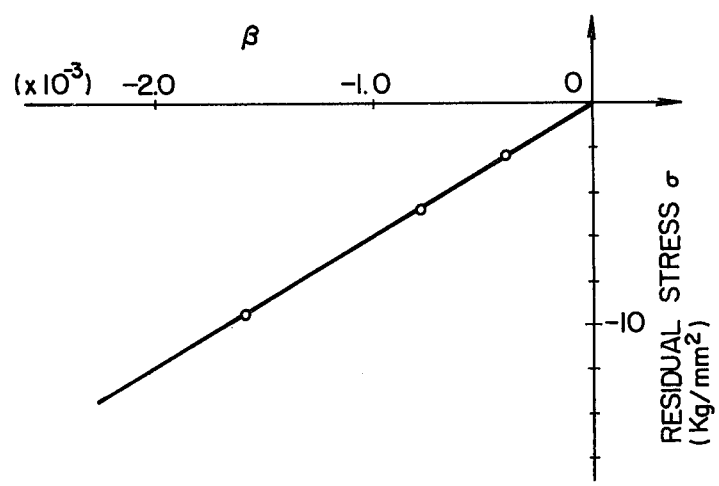
FIG. 4 is a diagram showing the dependence of the residual stress due to filling glass upon the difference of the contraction rate $\beta^-$ (difference of contraction rate between the ferrite and filling glass forming the core)

In the magnetic head shown in FIG. 2, the residual stress due to glass filling is calculated by the finite element method for the case when the core thickness t is 140 $\mu$m, the track width $t_w$ is 60 $\mu$m and the contraction length l is 200 $\mu$m, by way of example, and the relation between the residual stress thus calculated and the contraction difference $\beta$ is determined with the result shown in FIG. 4. If the absolute value of the contraction difference $\beta$ is at least $0.2 \times 10^{-3}$, the absolute value of the residual tensile stress is at least about 1 kg/mm$^2$. Since this value is greater than the residual stress generated by the ordinary work, it is believed that the residual stress can be controlled and the orientation of the easy axis of magnetization can also be controlled as described in the foregoing.

Figure 5:
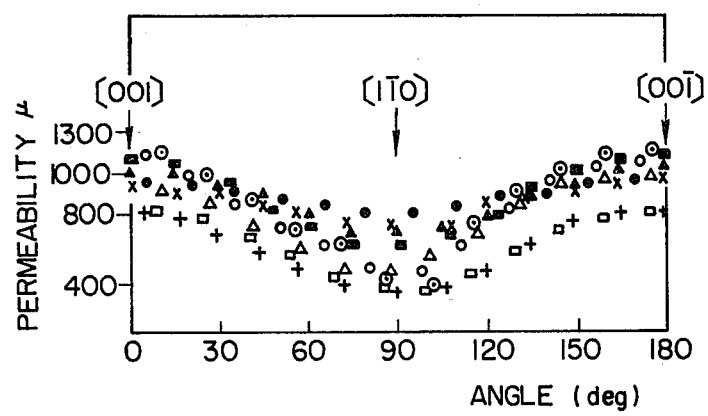
FIG. 5 is a diagram showing the anisotropy of magnetic permeability of the material formed by occluding 3 wt.% of SnO₂ in the ferrite of the composition of Table 1 in the {110} plane as the wide plane at 4 MHz.

As a matter of fact, when fused quartz was attached to about 100° C. and the anisotropy of permeability at 4 MHz inside the {110} plane was measured by applying the residual stress of about 1 kg/mm$^2$ to {110} plane discs produced from materials containing 3 wt.% of $SnO_2$ occluded in ferrite of the compositions shown in Table 1, respectively, the same anisotropy was confirmed for all the compositions as shown in FIG. 5, regardless of the positive or negative sign. The measured values of the samples Nos. 11 through 19 in Table 1 are represented by +, ×, ●, ■, △, ▲, □, o and in FIG. 5, respectively.

TABLE 1

| Sample No. | $Fe_2O_3$ (mol %) | MnO (mol %) | ZnO (mol %) | $K_1$ (erg/cc) |
|---|---|---|---|---|
| 11 | 53.0 | 22.0 | 25.0 | $2 \times 10^3$ |
| 12 | 51.6 | 24.4 | 24.0 | $-1 \times 10^3$ |
| 13 | 55.4 | 28.2 | 16.4 | $2 \times 10^3$ |
| 14 | 52.5 | 29.5 | 18.0 | $<1 \times 10^3$ |
| 15 | 50.7 | 31.7 | 17.6 | $-1.5 \times 10^4$ |

TABLE 1-continued

| Sample No. | Fe$_2$O$_3$ (mol %) | MnO (mol %) | ZnO (mol %) | K$_1$ (erg/cc) |
|---|---|---|---|---|
| 16 | 52.7 | 33.4 | 14.9 | $-1 \times 10^4$ |
| 17 | 50.8 | 34.3 | 14.9 | $-1.5 \times 10^4$ |
| 18 | 53.1 | 36.5 | 10.4 | $-2 \times 10^4$ |
| 19 | 55.6 | 23.6 | 20.8 | $4 \times 10^3$ |

Thus, the inventors of the present invention reached the fundamental concept that the magnetic anisotropy can be allowed to clearly appear near the gap by deliberately generating the internal stress near the gap and the write-and-read characteristics of the magnetic head can be improved by making the most of this magnetic anisotropy by way of optimizing the mode of orientation of the axis of magnetic anisotropy.

DESCRIPTION OF THE PREFERRED EMBODIMENTS

Hereinafter, the present invention will be described in further detail with reference to examples thereof.

EXAMPLE 1

Single crystal ferrite blocks were prepared by occluding 0.5, 1, 2, 3, 5, 6 and 7 wt.% of SnO$_2$ in Mn-Zn ferrite consisting of 54 mol% of Fe$_2$O$_3$, 27 mol% of MnO and 19 mol% of ZnO, respectively, without allowing SnO$_2$ to separate. Using these ferrite blocks under the condition of w=2.3 mm, h=1.75 mm, t=0.14 mm and d=55 μm in FIG. 6, magnetic coils shown in Table 2 were then prepared. Magnetic heads were produced by winding coils on these cores, and the total noise N, modulation noise Nm, erasing and rubbing noise Nr and amplifier noise Na of these magnetic heads were measured. In other words, the noise characteristics were comparatively evaluated with the magnetic head using the magnetic core of FIG. 6 in which the plane forming the principal magnetic circuit 62, 62' was on the {110} plane and the angle θ of the <100> direction included in the plane forming the principal magnetic circuit with respect to the gap-forming plane 63 was 25°.

TABLE 2

| Sample No. | l | φ |
|---|---|---|
| 31 | 100 μm | 45° |
| 32 | 200 μm | 45° |
| 33 | 500 μm | 45° |
| 34 | 200 μm | 30° |
| 35 | 200 μm | 60° |

Each of the abovementioned single crystal Mn-Zn ferrite containing the occluded SnO$_2$ was prepared by the known Bridgeman method using a starting material of a predetermined composition containing a predetermined amount of SnO$_2$.

Figure 6:
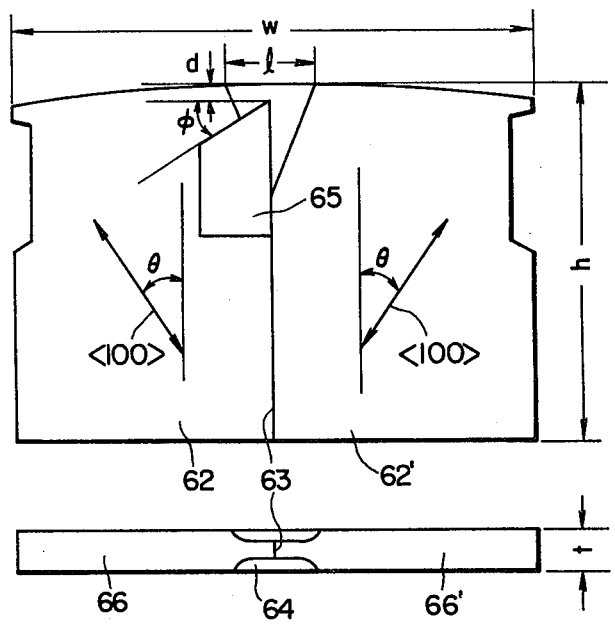
FIG. 6 is a front and plane view of the magnetic head in accordance with an embodiment of the present invention.

In FIG. 6, reference numeral 64 represents filling glass, 66 and 66' represent ferrite blocks and 65 represents coil-winding window. This filling glass 64 was obtained by so mixing the following glass A and glass B as to attain α of $87 \times 10^{-7}$ deg$^{-1}$ and β of $-0.7 \times 10^{-3}$. Namely, the glass A had a composition consisting of 27% of ZnO, 8% of Na$_2$O, 8% of BaO, 16% of SnO$_2$, 4% of Al$_2$O$_3$ and 37% of B$_2$O$_3$, the thermal expansion coefficient α (average of room temperature to 350° C.) of $74 \times 10^{-7}$ deg$^{-1}$ and the β value (the balance obtained by subtracting the contraction rate of the ferrite from that of the filling glass from the fusing temperature (approx. 450° C.) to the room temperature) of $-1.3 \times 10^{-3}$. The glass B had a composition consisting of 29% of ZnO, 3% of Na$_2$O, 8% of K$_2$O, 14% of BaO, 4% of CaO, 4% of SrO, 9% of SiO$_2$, 23% of B$_2$O$_3$, 5% of TiO$_2$ and 1% of LiO$_2$ and impurities, α of $107 \times 10^{-7}$ deg$^{-1}$ and β of $0.1 \times 10^{-3}$. These glass A and B were so mixed that α was $87 \times 10^{-7}$ deg$^{-1}$ and β, $-0.7 \times 10^{-3}$. These glass compositions were expressed in terms of the percent by weight.

Figure 7:
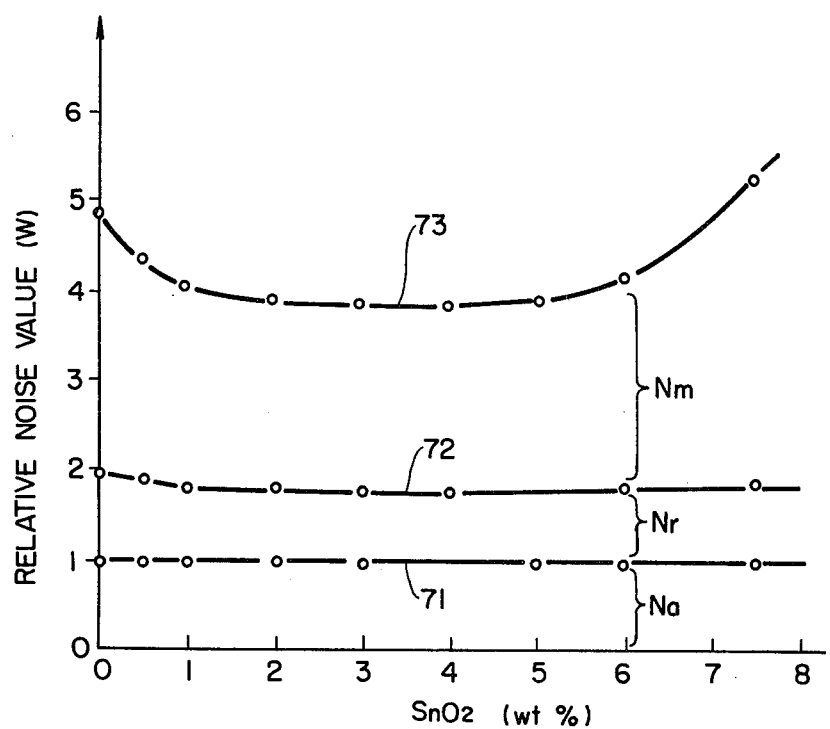
FIG. 7 is a diagram showing the dependence of the noise of the magnetic head in accordance with an embodiment of the invention upon the occluded amount of SnO₂.
Figure 8A:
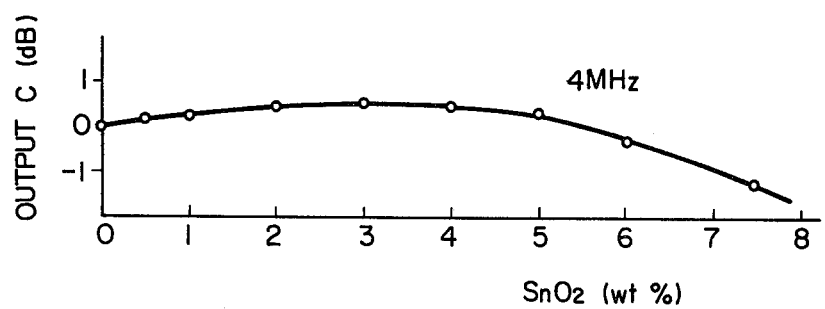
FIGS. 8(a) and 8(b) are diagrams showing the dependence of the output and carrier signal-to-noise ratio of the magnetic head using the Mn-Zn ferrite containing occluded SnO₂ upon the occluded amount of SnO₂.
Figure 8B:
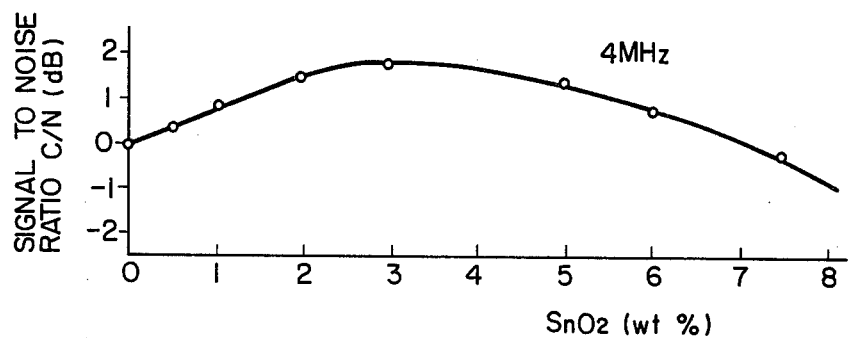

The results of measurement are illustrated in FIG. 7. FIG. 7 is a diagram showing the correlationship between the amount of SnO$_2$ occluded in the Mn-Zn ferrite and the noise and reference numeral 71 represents the amplifier noise Na, 72 represents the total of the erasing and rubbing noise Nr and the amplifier noise Na, and 73 represents the total noise of the modulation noise Nm, Na and Nr. The modulation noise accounts for the greatest proportion of the total noise. Moreover, it is confirmed that when SnO$_2$ is occluded in an amount up to 7% by weight, the modulation noise is reduced. The relation between the self write-and-read output C of the head at a frequency of 4 MHz and a recording wavelength of 1.4 μm, and the amount of SnO$_2$ in this instance is shown in FIG. 8(a) and the relation between the carrier signal-to-noise ratio C/N and the amount of SnO$_2$, in FIG. 8(b). Improvements in the C/N is observed when SnO$_2$ is occluded in an amount up to 7 wt.%. Especially when SnO$_2$ is occluded in amounts from 2 to 5 wt.%. improvements both in carrier signal and carrier signal-to-noise ratio C/N are remarkable, and the occlusion amount falling under this range is found most preferable.

EXAMPLE 2

Filling glass having various thermal expansion coefficients (or having various contraction rates) were produced using the glass obtained by so mixing the abovementioned glass A and B as to obtain desired α and β values. Magnetic heads were then produced using the abovementioned ferrite containing 3% of occluded SnO$_2$ under the same production condition as that of the abovementioned sample head in order to examine the relation between θ in FIG. 6 and the carrier signal-to-noise ratio C/N of each magnetic head and the relation between the α and β values of the filling glass and the write-and-read output C of each magnetic head. The α and β values of the filling glass used in this Example were $74 \times 10^{-7}$ deg$^{-1}$ ($-1.3 \times 10^{-3}$), $80 \times 10^{-7}$ deg$^{-1}$ ($-1.0 \times 10^{-3}$), $87 \times 10^{-7}$ deg$^{-1}$ ($-0.7 \times 10^{-3}$), $96 \times 10^{-7}$ deg$^{-1}$ ($-0.4 \times 10^{-3}$) and $105 \times 10^{-7}$ deg$^{-1}$ (0) with the values in the parenthesis representing the β values.

Figure 9:
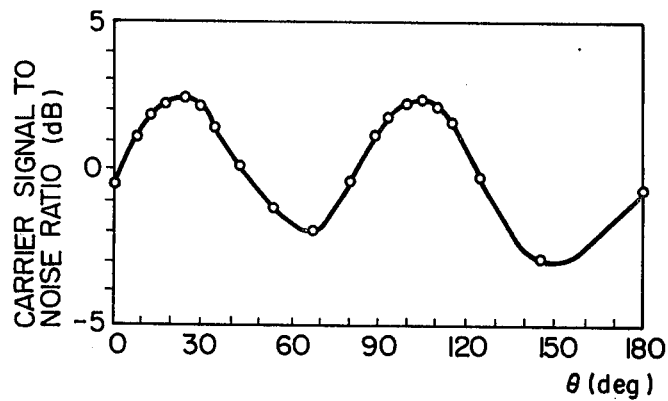
FIG. 9 is a diagram showing the relationship between $\theta$ of the magnetic head using glass having the difference of the contraction rate $\beta = -0.7 \times 10^{-3}$ with respect to the ferrite and the head carrier signal-to-noise ratio.
Figure 10:
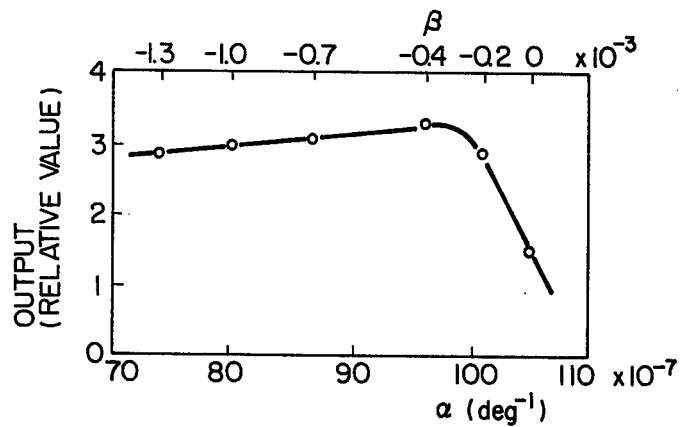
FIG. 10 is a diagram showing the relationship between $\beta$ or the coefficient of heat expansion $\alpha$ of the magnetic head and the head output when $\theta$ is 25°.

The results of measurement are shown in FIGS. 9 and 10. FIG. 9 is a diagram showing the relation between the carrier signal-to-noise ratio C/N (relative value) and θ (degree) when the glass having α of $87 \times 10^{-7}$ deg$^{-1}$ was employed (β: $-0.7 \times 10^{-3}$). FIG. 10 is a diagram showing the relation between the head output (relative output in an optional unit), α and β. Each measurement was carried out at a recording wavelength of 1.4 μm and a frequency of 4 MHz.

Contrary to the expectation, the write-and-read characteristics and the θ dependence of the carrier signal-to-noise ratio in this Example exhibit extremely clear 4-time symmetry. Of the greater importance is the fact that a magnetic head having extremely excellent characteristics, that could not be accomplished by the prior art, can really be obtained by using the ferrite containing 3% of SnO$_2$ occluded therein, by emphasizing the magnetic anisotropy near the gap and by setting $\theta$ to a suitable range.

As is obvious from FIG. 9, the excellent write-and-read characteristics and carrier signal-to-noise ratio can be obtained if $\theta$ is 5° to 40° or 85° to 120°. The further preferred $\theta$ range is 10° to 34° or 94° to 115° and the most preferred range is 20° to 30° or 100° to 110°. The best result can be obtained especially when $\theta$ is about 25° or about 105°.

As is also obvious from FIG. 10, the effect of the present invention can be observed when the $\beta$ value is negative, and the further preferred result can be observed when $\beta$ is below $-0.2 \times 10^{-3}$. Some magnetic heads using the filling glass having the $\beta$ value of $-1.3 \times 10^{-3}$ underwent cracking in the proximity of the gap, and if $\beta$ is smaller than this value, the production yield of the magnetic head is likely to lower. For this reason, the preferred range for the $\beta$ value is from $-0.2 \times 10^{-3}$ to $-1.3 \times 10^{-3}$.

EXAMPLE 3

The results of measurement shown in FIGS. 7, 8(a), 8(b), 9 and 10 were obtained for magnetic heads using single crystal Mn-Zn ferrite having a composition consisting of 54 mol% of $Fe_2O_3$, 27 mol% of MnO and 19 mol% of ZnO and further containing predetermined amounts of $SnO_2$ occluded therein, as described in the foregoing. When the same experiments were carried out using the single crystal Mn-Zn ferrite of the various compositions of Table 1 containing $SnO_2$ occluded therein, there could be obtained magnetic heads having write-and-read characteristics as well as carrier signal-to-noise ratios, within the abovementioned ranges of $\theta$ and $\beta$, from all the ferrite compositions, which heads exceeded the maximal performances of the prior art heads. The $K_1$ value of the Mn-Zn ferrite hardly changed even when $SnO_2$ was occluded in the ferrite composition, and those containing the occluded $SnO_2$ and those not containing the same had the $K_1$ value shown in Table 1. Accordingly, the experiments were the same as those which were conducted at the $K_1$ value of $-2.0 \times 10^4$ to $4 \times 10^3$ erg/cc. In addition, the effect of applying an internal stress in the case of $-2.0 \times 10^4$ erg/cc has almost the same effect as in the case of $8 \times 10^3$ erg/cc. In the experiments of the ferrite having the compositions of Table 1, if $K_1$ is $-2.0 \times 10^4$ to $8 \times 10^3$ erg/cc, or in the composition having the composition consisting of 40 to 66 mol% of $Fe_2O_3$, 10 to 50 mol% of MnO and 5 to 35 mol% of ZnO, the satisfactory results were found to be obtained. Incidentally, the inventors of this invention confirmed by measurements that the $K_1$ value of the ferrite having the abovementioned composition fell under the abovementioned range.

Figure 11A:
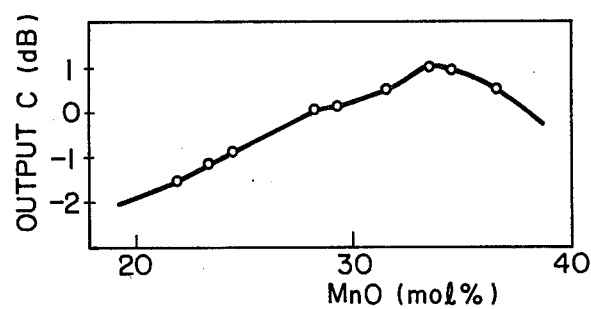
FIGS. 11(a), 11(b) and 11(c) are diagrams showing the dependence of the output, noise and carrier signal-to-noise ratio of the magnetic head using the Mn-Zn ferrite containing of 3 wt.% of occluded SnO₂ upon the MnO amount.
Figure 11B:
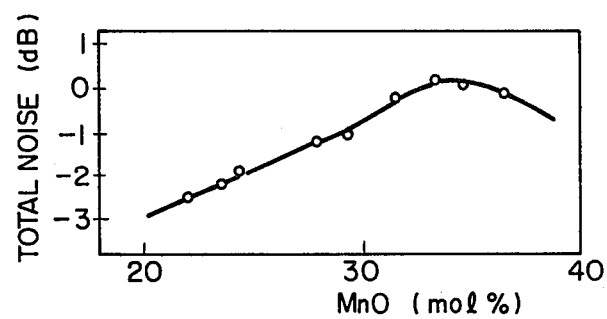
Figure 11C:
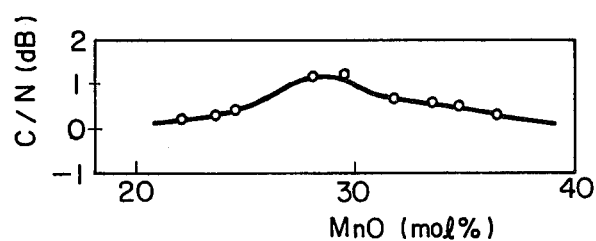

Among the abovementioned compositions, the composition which is easy for the growth of single crystal and for head work consists of 50 to 58 mol% of $Fe_2O_3$, 21 to 38.5 mol% of MnO and 10 to 25 mol% of ZnO. This composition is a more preferable composition as the head material because the ferrite composed of this composition has better magnetic characteristics such as higher saturation magnetic flux density. As a matter of fact, when the dependence of the write-and-read characteristics, total noise N and carrier signal-to-noise ratio C/N of the head of FIG. 6 produced from the single crystal ferrite block of each composition of Table 1 containing 3% by weight of occluded $SnO_2$, that had $\theta$ of 25°, upon the composition were examined in detail under the conditions of $l=200$ $\mu$m, $\phi=30°$, $w=2.33$ mm, $h=1.75$ mm, $t=0.14$ mm and $d=55$ $\mu$m, the dependence upon the composition was found specifically remarkable with respect to the MnO component, as shown in FIGS. 11(a) through 11(c). In other words, it was found that the C/N became highest in the composition having 26 to 30.5 mol% of MnO (that is, the ferrite consisting of 50 to 58 mol% of $Fe_2O_3$, 26 to 30.5 mol% of MnO and 11.5 to 24 mol% of ZnO and containing 3% by weight of occluded $SnO_2$), and this composition was found to be the most suitable material for the magnetic head. However, in the range of compositions other than the abovementioned composition, too, the C/N was found to be higher than the conventional head. The output became high especially when MnO was greater than 30.5 mol% (that is, in the ferrite composition consisting of 50 to 58 mol% of $Fe_2O_3$, 30.5 mol% (exclusive) to 38.5 mol% of MnO and 10 to 19.5 mol% (exclusive) of ZnO and added with 3 wt.% of occluded $SnO_2$). The noise was found to be especially low when MnO was below 26 mol% (that is, in the ferrite composition consisting of 50 to 58 mol% of $Fe_2O_3$, 21 to 26 mol% (exclusive) of MnO and 16 to 25 mol% of ZnO and added with 3 wt.% of occluded $SnO_2$). In conjunction also with the write-and-read circuit system, these compositions were found to be useful as the material for obtaining the high output or low noise.

Additionally, though single crystal growth and head working became more difficult, the $SnO_2$ occluded Mn-Zn ferrite consisting of 58 (exclusive) to 65 mol% of $Fe_2O_3$, 21 to 30 mol% of MnO and 5 to 21 mol% (exclusive) of ZnO had the saturation magnetic flux density of at least about 5500 [G]. By contrast, it was found that the magnetic head, prepared from the ferrite composition consisting of 63 mol% of $Fe_2O_3$, 26 mol% of MnO and 11 mol% of ZnO and added with 3 wt.% of occluded $SnO_2$, and having $\theta$ of 25°, had especially excellent recording characteristics.

The abovementioned experiments were carried out also for the magnetic heads in which the occlusion amount of $SnO_2$ was changed to 0.5, 1, 2, 5, 6 and 7.5 wt.%, and the taper angle $\phi$ of the winding window 65 in FIG. 6 and the length of narrowed portion of the gap l was variously changed as shown in Table 2. As a result, the head output characteristics and the carrier signal-to-noise characteristics were found to exhibit the same orientation dependence as shown in FIG. 9.

Figure 12:
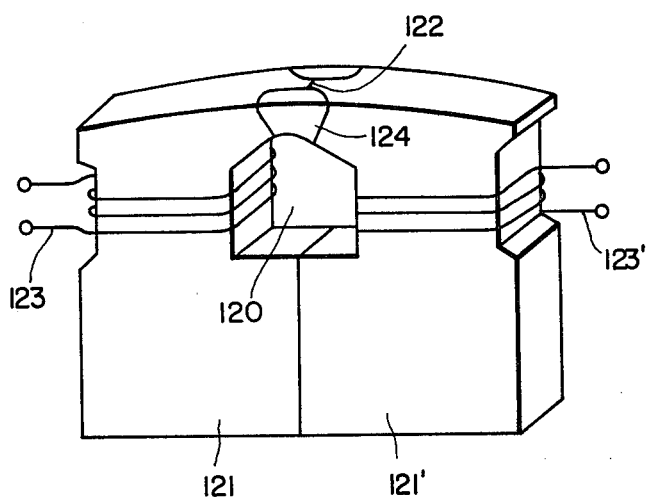
FIG. 12 is a perspective view showing the magnetic head in accordance with another embodiment of the present invention.

Further, in the magnetic heads used in the abovementioned experiments, the shapes of the winding window were asymmetric with each other on the right and left. However, when the experiments were carried out for the magnetic heads in which the shapes are symmetric with each other as shown in FIG. 12, the results of measurement were found to be the same as those mentioned above. In FIG. 12, reference numeral 120 represents the winding window, 121 and 121' represent the ferrite blocks and 122 represents the gap. Reference numerals 123 and 123' represent the coils and 124 does the filling glass.

When the plane forming the principal magnetic circuit is formed really by the {110} plane in the magnetic head in accordance with the present invention as described above, the abovementioned excellent effects can naturally be obtained. Substantially equivalent effects can also be obtained when the plane forming the principal magnetic circuit is inclined at about ±15° with respect to the {110} plane in the magnetic head.

In the foregoing examples of the invention, the magnetic blocks facing each other via the gap are composed of the Mn-Zn single crystal ferrite and the crystalline axis of the single crystal is disposed substantially symmetrically with respect to the gap-forming plane. As is obvious from the foregoing description, however, the same effects of the invention can be expected by restricting the angle $\theta$ of the gap-forming plane relative to the $\{100\}$ directions of both crystals to the abovementioned range even if the mode of orientation of the crystal axes is asymmetric. The effects of the present invention can also be obtained similarly when the condition of $\theta$ is satisfied in only one of the ferrite or when the single crystal Mn-Zn ferrite containing a predetermined amount of occluded $SnO_2$ is employed for one of the magnetic blocks with the proviso that the condition of $\theta$ is satisfied.

Since numerous changes and different embodiments of the present invention may be made by those skilled in the art without departing from the spirit and scope thereof, it is intended that all matters contained in the description shall be interpreted as only illustrative and not in limiting sense.

What is claimed is:

1. A magnetic head characterized in that at least one of two magnetic blocks of high permeability facing each other via a gap consists of single crystal Mn-Zn ferrite containing up to 7% by weight of $SnO_2$ that is occluded therein without being allowed to separate thereby reducing the modulation noise of said magnetic head; the $\{110\}$ plane of at least one of said single crystal Mn-Zn ferrite is made substantially parallel to the plane forming the principal magnetic circuit; an angle $\theta$ of the direction of $<100>$ existing inside said $\{110\}$ plane with respect to the gap-forming plane is 5° to 40° or 85° to 120°; and glass having a contraction rate at the time when the temperature is reduced from the glass setting temperature down to room temperature is lower than the contraction rate of said ferrite is fuse-attached to the surfaces of said magnetic blocks of high permeability at least near the gap.

2. The magnetic head as defined in claim 1 wherein said single crystal Mn-Zn ferrite contains 2 to 5% by weight of $SnO_2$ occluded therein.

3. The magnetic head as defined in claim 1 or 2 wherein said angle $\theta$ is 10° to 34° or 94° to 115°.

4. The magnetic head as defined in claim 1 or 2 wherein said angle $\theta$ is 20° to 30° or 100° to 110°.

5. The magnetic head as defined in claim 1 or 2 wherein said angle $\theta$ is about 25° or about 105°.

6. The magnetic head as defined in claim 1 or 2 wherein the balance obtained by subtracting the contraction rate of said ferrite from the contraction rate of said glass at the time when the temperature is reduced from the glass setting temperature down to room temperature is $-0.2 \times 10^{-3}$ to $-1.3 \times 10^{-3}$.

7. The magnetic head as defined in claim 1 or 2 wherein said single crystal Mn-Zn ferrite in which $SnO_2$ is to be occluded consists of 40 to 66 mol% of $Fe_2O_3$, 10 to 50 mol% of MnO and 5 to 35 mol% of ZnO.

8. The magnetic head as defined in claim 1 or 2 wherein said single crystal ferrite in which $SnO_2$ is to be occluded consists of 58 (exclusive) to 65 mol% of $Fe_2O_3$, 21 to 30 mol% of MnO and 5 to 21 mol% (exclusive) of ZnO.

9. The magnetic head as defined in claim 1 or 2 wherein said single crystal ferrite in which $SnO_2$ is to be occluded consists of 50 to 58 mol% of $Fe_2O_3$, 26 to 30.5 mol% of MnO and 11.5 to 24 mol% of ZnO.

10. The magnetic head as defined in claim 1 or 2 wherein said single crystal ferrite in which $SnO_2$ is to be occluded consists of 50 to 58 mol% of $Fe_2O_3$, 21 to 26 mol% (exclusive) of MnO and 16 to 25 mol% of ZnO.

11. The magnetic head as defined in claim 1 or 2 wherein said single crystal ferrite in which $SnO_2$ is to be occluded consists of 50 to 58 mol% of $Fe_2O_3$, 30.5 (exclusive) to 38.5 mol% of MnO and 10 to 19.5 mol% (exclusive) of ZnO.

* * * * *